United States Patent [19]

Brange

[11] 3,954,426
[45] May 4, 1976

[54] METHOD FOR CLEANING A DUST FILTER
[75] Inventor: Lennart Bertil Vilhelm Brange, Malmo, Sweden
[73] Assignee: Inoma Filter AB, Skelleftea, Sweden
[22] Filed: Feb. 25, 1974
[21] Appl. No.: 445,419

[30] Foreign Application Priority Data
Feb. 26, 1973 Sweden.............................. 7302633

[52] U.S. Cl..................................... 55/96; 55/292; 55/302
[51] Int. Cl.² ........................................ B01D 46/04
[58] Field of Search ............... 55/227, 96, 292, 302; 134/1, 37

[56] References Cited
UNITED STATES PATENTS

| | | | |
|---|---|---|---|
| 2,854,091 | 9/1958 | Roberts et al. | 55/292 |
| 3,053,031 | 9/1962 | Vedder et al. | 55/292 |
| 3,158,455 | 11/1964 | Lincoln | 55/292 |
| 3,366,234 | 1/1968 | Suhm et al. | 55/277 |
| 3,413,781 | 12/1968 | Abboud | 55/292 |
| 3,421,295 | 1/1969 | Swift et al. | 55/302 |
| 3,685,257 | 8/1972 | Bunke | 55/292 |

Primary Examiner—Bernard Nozick
Attorney, Agent, or Firm—Jones, Tullar & Cooper

[57] ABSTRACT

For cleaning a dust filter having a filter element of flexible material forming at least partly a flow passage there is imparted to wave movement to the filter element and another wave movement to the fluid in the flow passage by means of fluid impulses supplied by an oscillation generating member substantially in the main direction of the flow passage. The wave movements are related and coupled to one another in such a way that the movement amplitude of the oscillation of the filter element and the pressure and speed amplitudes of the oscillation of the fluid will reach their peaks essentially simultaneously.

9 Claims, 8 Drawing Figures

METHOD FOR CLEANING A DUST FILTER

The present invention relates to a method and a device for cleaning a dust filter of the kind comprising a filter element of flexible and/or tensile material which is gas or steam permeable but which is impermeable to solid particles above a certain size.

Dust filters of the related kind are used in various connections to separate dust particles from gas or steam media. In order to maintain the efficiency of the filters it must be prevented that they are stopped, and so the filters must be cleaned at intervals. Various methods for cleaning filter elements are known.

According to a longstanding method for cleaning filter elements, particularly gas filters, from dust particles the filter element is subjected to shaking or mechanical vibration. Hereby the filter elements having, for instance, the form of filter bags suspended in a filter housing, are subjected at the attachment ends thereof to the influence of mechanical vibrations which are propagated in the filter material thereby causing the disengagement of the dust particles from the surface of the filter walls from where they are collected on the bottom of the filter housing and removed. This method for cleaning, however, has the drawback that the mechanical vibrations required for cleaning may cause undue stress phenomena and result in considerable wear of the filter especially at the attachment end thereof, which may result in a rupture in the filter material and incur a stoppage in order to shift the filter element.

According to another prior art method for cleaning gas filters having filter bags suspended in a filter housing said filter bags are "inflated" at a low frequency of repetition. Not only will the amount of gas used in this method for cleaning be considerable and a uniform cleaning effect over the whole of the filter surface difficult to obtain but it also appears that the method applied to filter constructions comprising a plurality of filter bags in a filter housing will entail complicated and costly installations including cleaning nozzles above the filter bags, which are movable to be disposed above the filter bag or bags to be cleaned.

In recent years, however, it has become increasingly frequent to utilize audible sound for cleaning gas filters. Sound waves from a sound transmitter disposed in the filter housing are brought to activate the filter elements and good cleaning results have been achieved by using a sufficiently high sound effect. A critical shortcoming of this method for cleaning is the high level of noise which will arise outside the filter housing and which may necessitate extensive sound insulation of the filter construction.

It is the object of the present invention to provide a method and a device for cleaning dust filters whereby an adequate cleaning effect resulting in an even distribution over the whole of the filter surface with low wear of the filter material and a low level of noise outside the filter housing is obtained.

The said objects are achieved according to the invention by a method for cleaning dust filters of the kind comprising a gas or steam permeable filter element of a flexible and/or tensile material which cannot be permeated by solid particles exceeding a certain size and which separates an inlet for contaminated gas from an outlet for purified gas or steam, said filter element forming wholly or partly the limiting wall of the flow passage, characterized in that wave movements are imparted one to the filter element and another one to the gas or steam existing in said flow passage, under the influence of gas impulses delivered in connection with the flow passage and essentially in its main direction and effected by means of an oscillation generating member which is brought to deliver said gas impulses at a frequency within a frequency range having a lower limit frequency at which the wave length substantially coincides with the length of the filter element in the direction of the flow passage and with an upper limit frequency at which a quarter of a wave length substantially corresponds to the smallest extension of the cross section of the flow passage perpendicular to the direction of the flow passage, said wave movements having mutually the same frequency and the same direction and rate of propagation in the flow passage, one of said wave movements materializing in oscillations in the filter element in the transverse direction relative to the filter surface which oscillations in a cross section perpendicular to the direction of propagation of the waves at any arbitrary time will have the same direction relative to the plane of the filter surface at all locations on the circumference of the cross section, and the other wave movement materializing in oscillations in the gas or steam existing in the flow passage, in the form of pressure and rate variations substantially in the direction of propagation of the waves, said wave movements being coupled to one another in such a way that the movement amplitude of the oscillation of the filter element and the pressure and speed amplitudes of the oscillation of the gas or steam will reach their peaks essentially simultaneously.

According to the invention there is also provided an apparatus for performing the above method, comprising a filter housing with an inlet for gas or steam mingled with dust and an outlet for purified gas or steam which are separated from one another by at least one gas or steam permeable filter element of a flexible or tensile material which cannot be permeated by dust particles exceeding a certain size, each filter element wholly or partly forming a limiting wall in a flow passage and each being associated with a member for delivering pressurized gas impulses substantially in the main direction of the flow passage pertaining thereto, characterized in that each member for delivering pressurized gas impulses is connected with a pressurized gas impulse generator which is arranged to generate pressurized gas impulses in a frequency range of 3 to 50 cps.

A detailed description of the invention will be given below with reference to the accompanying drawings in which FIG. 1 is a diagram of an illustrative embodiment of a filter cleaning device for performing the method according to the invention;

Figure 5:
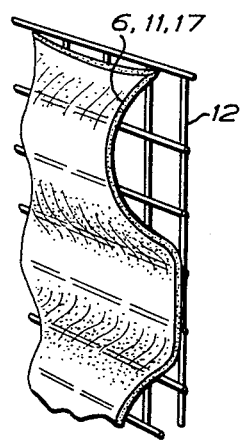
Figure 6:
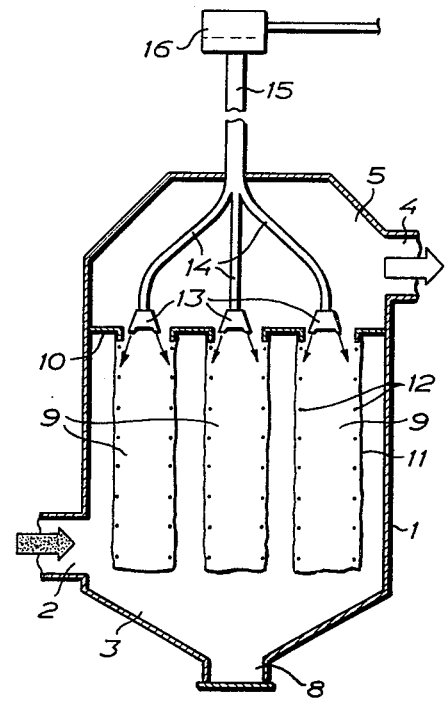
Figure 7:
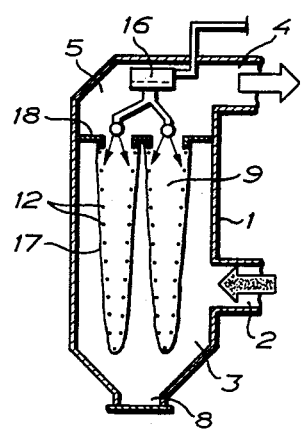
Figure 8:
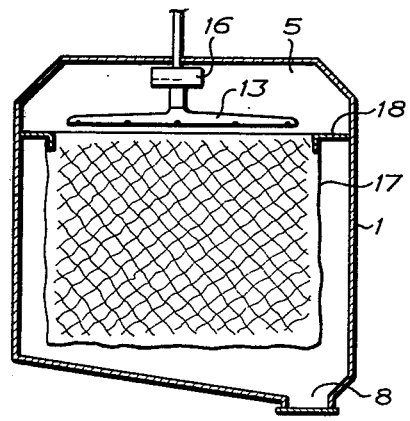

FIG. 5 discloses a portion of a filter element with a backing;

FIG. 6 shows diagrammatically the cleaning device for performing the method according to the invention comprising several filter bags suspended in a filter housing;

FIGS. 7 and 8 are vertical cross and longitudinal sections through a filter cleaning device for cleaning so called cassette filters.

Figure 1:
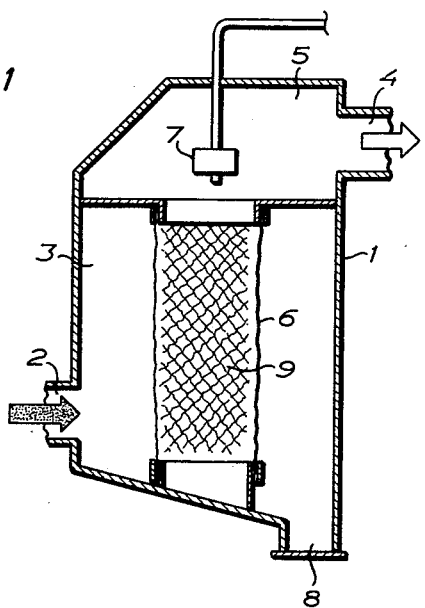

The device which is shown diagrammatically in FIG. 1 comprises a filter housing 1 with an inlet 2 for contaminated gas to an inlet chamber 3 and an outlet 4 for purified gas from an outlet chamber 5. The inlet chamber 3 and the outlet chamber 5 are separated from each other by means of a filter element 6 comprising a gas permeable filter material which cannot be permeated by solid particles above a certain size. When the gas passes through the filter element 6 dust particles are deposited on the outer side of the filter element and the purified gas is discharged through the outlet passage 4. In the outlet chamber 5 above the filter element 6 there is arranged an oscillation generator 7 connected with a drive source which is not shown in the figure. The dust particles removed from the exterior of the filter element 6 in the process of the cleaning are conveyed upwardly or downwardly depending on the density of the dust particles in relation to the density of the gas. In the device illustrated in FIG. 1 it is foreseen that the dust particles removed from the exterior of the filter element 6 will fall or sink down towards the sloping bottom of the filter housing which is provided with a discharge opening 8 which is normally closed and through which the collected dust particles may be removed at uniform intervals.

Thus, according to the invention the device shown diagrammatically in FIG. 1 comprises a gas or steam permeable filter element 6 of a flexible and/or tensile material which cannot be permeated by solid particles exceeding a certain size and which separates an inlet 2 for contaminated gas from an outlet 4 for purified gas or steam, said filter element 6 forming wholly or partly the limiting wall of a flow passage 9. The existence of said flow passage is essential to the method according to the invention and in the device according to FIG. 1 the flow passage is formed entirely by the filter element 6 forming the walls of the flow passage. It is not an essential requirement of the method according to the invention, however, that all the walls of the flow passage 9 are made of a filter material; it will be sufficient if one wall or merely a portion of the walls is of filter material. As in the device according to FIG. 1 the flow passage may be an interior flow passage outwardly defined by the filter element 6, but the flow passage may also be an external flow passage inwardly defined by the filter element 6 and outwardly defined by the surrounding filter housing. Due to the form of the filter construction there may be provided an internal as well as an external flow passage.

Figure 2:
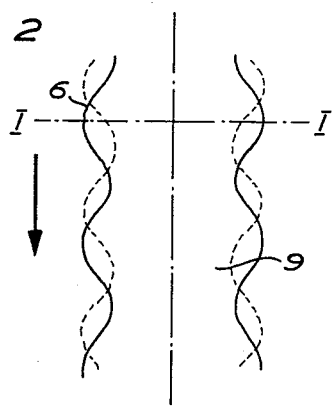
FIG. 2 illustrates the wave movement in a diagrammatical longitudinal section through a filter element.

The characteristic features of the method according to the invention is that wave movements are imparted, one to the filter element 6 and another one to the gas or steam existing in said flow passage 9, under the influence of gas impulses delivered in connection with the flow passage and essentially in its main direction and effected by means of an oscillation generating member 7 which is brought to deliver said gas impulses at a frequency within a frequence range having a lower limit frequency at which the wave length substantially coincides with the length of the filter element in the direction of the flow passage, and an upper limit frequency at which a quarter of a wave length substantially corresponds to the smallest extension of the cross section of the flow passage perpendicular to the direction of the flow passage, said wave movements having mutually the same frequency and the same direction and rate of propagation in the flow passage, one of said wave movements materializing in oscillations in the filter element 6 in the transverse direction relative to the filter surface which oscillations in a cross section perpendicular to the direction of propagation of the waves, at any arbitrary time will have the same direction relative to the plane of the filter surface at all locations on the circumference of the cross section, and the other wave movement materializing in oscillations in the gas or steam existing in the flow passage, in the form of pressure and rate variations substantially in the direction of propagation of the waves, said wave movements being coupled to one another in such a way that the movement amplitude of the oscillation of the filter element and the pressure and speed amplitudes of the oscillation of the gas or steam will reach their peaks essentially simultaneously. The wave movements in the filter material and the gas which are characteristic of the method according to the invention are described in greater detail with reference to FIG. 2 which shows diagrammatically the longitudinal section through a flow passage defined by one of the filter walls 6 in the process of wave generation. The wave movements in the filter element 6 as well as in the gas existing in the flow passage 9 have been effected by means of an oscillation generating member. The oscillations in the filter element take place substantially in transverse direction in relation to the plane of the filter surface and have, furthermore, the same direction at each time along the circumference of the cross section of the filter. Each location on a cross section of a filter, for instance a section indicated in the figure by I—I will thus at each time have the same direction of movement outwardly or inwardly in relation to the center line of the flow passage indicated by the dash and dot lines. The cross section I—I is a cross section in which the movement amplitude of the oscillations of the filter have reached their peak. Dust particles on one side of the filter wall will be influenced by acceleration forces tending to tear away the particles from the filter material. It should be noted that particle removing acceleration forces will be active at each point along the whole circumference of the filter section resulting in a uniform cleaning action along the whole circumference of the filter section.

The wave movement in the gas materializes in pressure and speed variations substantially in the direction of wave propagation indicated by an arrow and characteristic of both wave movements. The wave movement in the gas is coupled to the wave movement in the filter element in such a way that the pressure and the speed amplitudes of the oscillation in the gas and the movement amplitude of the filter material will reach their peak values substantially simultaneously. Thus, in the section I—I indicated in the figure, maximum pressure will prevail in the gas and maximum movement amplitude substantially in the direction of the wave propagation. The prevailing pressure and movement conditions of the gas will now act to remove dust particles from the filter section.

The maximum particle removing effect of each of the wave movements will thus coincide in one and the same section resulting in a good cleaning action in the section in question. Since in the method according to the invention the two wave movements have the same frequency, direction of propagation, and rate of propagation in the flow passage, each cross section of the filter element will consequently be subjected to the combined cleaning effect of the wave movements. Thus, the filter cleaning will be uniformly distributed over the whole surface of the filter.

The wave movements described above can be generated by means of different types of oscillation generating members. Said oscillations may, for instance, be generated by means of members which are disposed at one end of the filter element and which will effect a cross section of the filter element by periodically restricting and distending the filter wall. In gas or steam filters, however, it is preferable to use a pneumatic pulsator as an oscillation generator, the wave movements being effected under the influence of periodical pressure impulses delivered from the pulsator. The pulsator may be disposed above the flow passage, as shown in FIG. 1, and deliver the pressure impulses into said passage. In an alternative embodiment the pulsator may be adapted to deliver the pressure impulses outside said flow passage and toward the filter material. It is not an essential requirement that the pressure impulses be delivered at one end of the filter element, they may be delivered anywhere near the flow passage. As oscillation generators it may be advantageous to use pneumatic pulsators of a kind delivering a net flow in the process of pulse generation. The pressurized gas transport in the direction of the wave propagation will further contribute to improving the cleaning effect and may simultaneously carry away the dust particles disengaged from the filter surface. If the nozzle of the pulsator is formed in such a way that a high gas speed is obtained the ejector effect may be utilized for diverting gas from the atmosphere surrounding the nozzle and for generating a more intensive wave movement. Hereby a gas volume which is large in relation to the gas consumption of the pulsator is obtained which is conveyed through the flow passage and participates in the oscillations. In a preferred embodiment of the invention a pneumatic membrane valve pulsator is used as an oscillation generating member. Said type of oscillation generator is simple and reliable and of a distinct pulse character having a frequency which may easily be adapted within the frequency range which has proved efficient in gas filters as far as the cleaning is concerned.

The frequency at which the oscillations are generated is of great importance for the cleaning result, the selection of a suitable frequency being dependent of several factors such as the geometry and properties of the filter, the attachment of the filter, the kind of fluid etc. When testing conventional gas filters the best cleaning result has been found within a certain defined frequency range. At higher frequencies the amplitude of the wave movement will be insufficient and at lower frequencies only a purely quasi-stationary expanding retracting movement of the filter element will be obtained. Thus, the wave movements produced by the method according to the invention will have an upper and a lower limiting frequency within which range a sufficiently large amplitude of oscillations are obtained in order to provide a satisfactory cleaning effect. The limiting frequencies will depend on several different factors such as the filter material, the filter geometry, the attachment of the filter, the surface weight of the filter material, the properties of the fluid etc. The lower limiting frequency over which the wave movement is of dominating importance for the transverse amplitude of the filter material, is the frequency at which the wave length will coincide, by a rough approximation, with the length of the filter in the direction of the flow passage. The upper limiting frequency will be at the frequency where a quarter of a wave length will equal by a rough approximation the smallest extension of the cross section of the flow passage perpendicular to the direction of wave propagation of the circular cylindric filter diameter. At higher frequencies the flow in the flow passage will no longer be substantially one-dimensional but two- or three-dimensional. The amplitude of the wave movement may be limited for various reasons, such as the friction of the flow in the flow passage; lack of homogeneity in the filter material and in the axial distribution of stresses in the filter; energy emitted on the side of the filter material opposite the flow channel. According to the invention the suitable frequency range for conventional types of gas filters is between 3 and 50 cps. At tests performed with a filter bag of a circular cross section very good cleaning results have been obtained at 3 to 25 cps and at tests with a so called cassette filter of the kind shown in FIG. 7 good results have been noted at 10 to 35 cps.

Figure 3:
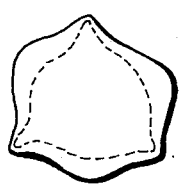
FIGS. 3 and 4 are diagrammatical cross sections through a filter element having a creased structure and illustrate different amplitudes of oscillation of the filter element.
Figure 4:
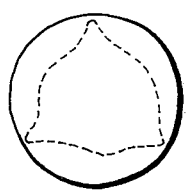

As will appear from the above the oscillation amplitude is of great importance for the result of the cleaning and this point will be further elucidated in the following. In order to operate in a satisfactory way the filter elements are usually attached at the ends thereof. The attachment in different types of filters may be effected with different degrees of strain in the longitudinal direction of the filter element. In the circumferential direction, however, the filter elements are usually not strained and in filter elements of an oval or circular cross section they will usually obtain some form of crease structure. FIGS. 3 and 4 show diagrammatically a cross section of a filter element of a crease structure, the circumference of the filter element at the smallest movement amplitude thereof being indicated with dotted lines and the contour lines of the circumference of the maximum amplitude of the oscillation being indicated by solid lines. FIG. 3 illustrates the effect of an oscillation movement in the filter material whose amplitude is not adequate to effect circumferential distension of the filter material. Certain cleaning effect will be obtained already under the influence of these oscillations, but if the amplitude of the oscillations is sufficiently great to effect changes in the cross section form from a state with crease structure of the filter material which is the case with the contour line of the circumference of the filter section indicated by dotted lines in FIGS. 3 and 4, into a state with such circumferential distension of the filter material that substantially only circumferential tensile stresses will prevail in the cross section which is the case with the contour line of the circumferential filter material indicated in FIG. 4 by a solid line, this will result in considerably greater acceleration forces acting on the dust particles on the filter material. From a point of view of cleaning it is preferable that the oscillations are given a sufficiently great amplitude to obtain the circumferential distention illustrated by FIG. 4.

In filter elements of the type illustrated diagrammatically in the FIGS. 6 and 7 the filter bags are inwardly provided with a grid in order to prevent that the filter is compressed in the course of gas purification. If said grid is disposed at a convenient distance in relation to the filter element a cleaning effect may be obtained also by the impingement of the filter against said grid as illustrated in FIG. 5. Even if the cleaning may be somewhat improved thereby it cannot be excluded that this will result in a simultaneous increased wear of the filter.

In the FIGS. 6, 7 and 8 two conventional types of gas filters are shown diagrammatically, which are formed for cleaning in the manner described above. Thus, the filter construction shown in FIG. 6 comprises a filter housing 1 with an inlet 2 for dustmingled gas into an inlet chamber 3 and an outlet 4 for purified gas from an outlet chamber 5. The inlet chamber 3 and the outlet chamber 5 are separated by means of a number of filter bags 11 suspended in an intermediate wall 10, said bags being inwardly provided with a grid construction 12 to prevent compression of the filter bags. Above each of the flow passages 9 surrounded by the filter bags 11 an exhaust nozzle 13 opens, said nozzle being connected over a conduit 14 and a manifold 15 with a pneumatic pulsator 16 which is preferably of the membrane valve type which is connected in its turn over a conduit with a pressurized gas source not shown in the figure. As will appear from the figure the pulsator 16 is disposed outside and at a distance from the filter housing. By conveniently adapting the area and shape of the nozzles 13 the areas and shape of the conduits 14 and 15, a satisfactory pulse supply may be obtained above each of the filter bags 11 despite the fact that the pulsator 16 will be at a considerable distance from the filter housing. Said adaptation means that nozzles and conduits will be dimensioned in such a manner that the reflection of gas pulses therein is obviated, thereby preventing distorsion and weakening of the pulses. The nozzles used for supplying the gas pulses may be formed and oriented in various ways. It has proved advantageous, however, to direct the openings of the nozzles toward the filter wall so that the pulses are given off forwards outwardly in the axial direction of the flow passage in the way diagrammatically indicated in FIG. 6. At an angle of inclination toward the axis of the flow passage of about 10° to 40° particularly great amplitudes of oscillations in the filter element have been observed. It is preferable that there be several nozzle openings and that they are symmetrically spaced along the circumference of the nozzle.

When the filter is to be cleaned the supply of contaminated gas is interrupted after which pressure medium is supplied to the pulsator 16 which will emit gas pulses of the selected frequency through the manifold 15 the conduits 14 and the nozzles 13, said frequency being within the range of 3 to 50 cps and preferably within the range of 3 to 25 cps. Thereby the wave movement described above will be produced in the filter material and in the gas resulting in the disengagement of dust particles from the outer side of the filter bags 11 after which they will be collected on the bottom of the filter house from where the collection of dust may be discharged and removed through the bottom discharge opening 8.

The FIGS. 7 and 8 show diagrammatically another common type of gas filter. FIG. 7 shows a vertical cross section and FIG. 8 a vertical longitudinal section of the filter construction. The device comprises a filter housing 1 with an inlet 2 for contaminated gas into an inlet chamber 3 and an outlet 4 for purified gas from an outlet chamber 5. The outlet chamber 5 and the inlet chamber 3 are separated by means of a number of filter bags 17 in the form of so called cassette filters of a substantially rectangular longitudinal horizontal cross section. The cassette filters 17 are attached to an intermediate wall 18 in the filter housing 1. Similar to the filter bags of the above filter construction the cassette filters are inwardly provided with a grid construction to prevent compression of the cassette fibers. In the outlet chamber there is arranged a pneumatic membrane valve pulsator which is adapted, by means of conduits provided with nozzles at the ends thereof, to deliver pressurized gas pulses into the flow passages 9, surrounded by the cassette filters. Due to the great horizontal extension of the cassette filters the nozzle has been given an elongated shape with a plurality of nozzle openings spaced along the nozzle, said openings being arranged in such a way that the pulses are given off at an acute angle with respect to the filter surface in a way corresponding to what has been indicated above in connection with FIG. 6. The bottom of the filter housing slopes toward an outlet provided with a shutter. The cleaning of the filter is effected in the same manner as described above in connection with FIG. 6.

In the above illustrative embodiment the filter construction is of the kind in which the dust particles are deposited on the outer side of the filter element. However, the invention is not limited to this embodiment but may be applied also to filter constructions where the dust is deposited on the inside of the filter element. Neither is the invention limited to an embodiment in which the pulses as shown in FIGS. 6, 7 and 8 are delivered, into the filter element but also includes, as stated above, supplying the pulses near the outer side of the filter element.

Thus, the invention is not limited to the disclosed illustrative embodiments but may be varied within the scope of the following claims.

What I claim is:

1. A method for cleaning dust filters of the kind comprising an inlet for comtaminated fluid; an outlet for purified fluid; a fluid permeable filter element including wall means of a flexible material which is impermeable to solid particles exceeding a certain size and which separates the inlet from the outlet, said filter elements having an axis and defining an axial flow passage for the fluid being filtered; and an oscillation generating member disposed at one end of the flow passage for supplying gas impulses to the fluid in the flow passage for imparting movement to the filter element, which method comprises the steps of:
   a. supplying a fluid to be purified to said inlet;
   (b) causing said fluid to flow from said inlet through said filter element and said flow passage to said outlet;
   c. imparting to the filter element by means of said gas impulses a first wave movement materializing in oscillations in the wall means of the filter element, said oscillations having a selected frequency and propagating in the axial direction of said filter element at a selected velocity, said oscillations being in the transverse direction relative to said axis and to the surface of the filter element before the element is subjected to said oscillations such that in a cross section of the filter element taken on a plane perpendicular to said axis and to the direction of the propagation of said first wave movement, at any given time, the movement of said wall means due to said oscillations will have the same direction with respect to said axis at all locations along the periphery of the filter element lying in said plane;
   d. imparting to the fluid existing in the flow passage by means of said gas impulses a second wave movement having the same frequency and the same direction and velocity of propagation in the flow passage as said first wave movement, said second wave movement materializing in the form of pressure and velocity variations in the fluid existing in the flow passage and traveling substantially in the direction of propagation of said second wave movement;

e. coupling said movement to one another in such a way that the movement amplitude of the oscillation of the filter element and the pressure and velocity amplitudes of the oscillation of the fluid in the flow passage will reach their peaks essentially simultaneously in every specific cross section of the flow passage; and f. limiting said gas impulses to a range having a lower limit frequency at which the wave length of said movements substantially coincides with the length of the filter element in the direction of the flow passage, and an upper limit frequency at which a quarter of a wave length of said movements substantially corresponds to the smallest distance across the flow passage taken perpendicular to the direction of the flow passage.

2. A method as claimed in claim 1, wherein the oscillation generating member is brought to deliver gas impulses with a frequency within a frequency range of 3 to 50 cps.

3. A method as claimed in claim 1 for cleaning dust filters of the hose type, wherein the oscillation generating member is brought to deliver impulses with a frequency within a frequency range of 3 to 25 cps.

4. A method as claimed in claim 1 for cleaning dust filters of the cassette type, wherein the oscillation generating member is brought to deliver gas impulses with a frequency within a frequency range of 10 to 35 cps.

5. A method as claimed in claim 1, wherein each cross section of the filter element perpendicular to the longitudinal extension of the flow passage under the influence of said wave movements is given periodical changes in its cross sectional form between a state of crease structure of the cross section and a state of circumferential distention in which essentially only tensile forces prevail in the circumferential direction of the cross section.

6. A method for cleaning dust filters of the kind comprising an inlet for contaminated fluid; an outlet for purified fluid; a fluid permeable filter element including wall means of a flexible material which is impermeable to solid particles exceeding a certain size and which separates the inlet from the outlet, said filter element having an axial flow passage for the fluid being filtered, and an oscillation generating member disposed at one end of the flow passage for supplying gas impulses to the fluid in the flow passage for imparting movement to the filter element, which method comprises the steps of:

a. supplying a fluid to be purified to said inlet;

b. forcing said fluid to flow from said inlet through said filter element and through said flow passage to said outlet;

c. imparting to the filter element by means of said gas impulses a first wave movement materializing in oscillations in the wall means of said filter element, said oscillations having a frequency of from about 3 to about 50 cps. and propagating at a selected velocity in the axial direction of said filter element, said oscillations being in the transverse direction relative to said axis and to the surface of the filter element before the element is subjected to said oscillations such that in a cross section of the filter element taken on a plane perpendicular to said axis and to the direction of the propagation of said first wave movement, at any given time, the movement of said wall means due to said oscillations will have the same direction with respect to said axis at all locations along the periphery of the filter element lying in said plane;

d. imparting to the fluid existing in the flow passage by means of said gas impulses a second wave movement having the same frequency and the same direction and velocity of propagation in the flow passage as said first wave movement, said second wave movement materializing in the form of pressure and velocity variations in the fluid existing in the flow passage and traveling substantially in the direction of propagation of said second wave movement; and e. coupling said movements to one another in such a way that the movement amplitude of the oscillation of the filter element and the pressure and velocity amplitudes of the oscillation of the fluid in the flow passage will reach their peaks essentially simultaneously.

7. A method as claimed in claim 6 for cleaning dust filters of the hose type, wherein the means for supplying gas impulses is brought to deliver impulses with a frequency within a frequency range of 3 to 25 cps.

8. A method as claimed in claim 6 for cleaning dust filters of the cassette type, wherein the means for supplying gas impulses is brought to deliver gas impulses with a frequency within a frequency range of 10 to 35 cps.

9. A method as claimed in claim 6, wherein each cross section of the filter element perpendicular to the axial direction of the flow passage under the influence of said wave movements is given periodical changes in its cross sectional form between a state of crease structure of the cross section and a state of circumferential distention in which essentially only tensile forces prevail in the circumferential direction of the cross section.

* * * * *

UNITED STATES PATENT OFFICE
CERTIFICATE OF CORRECTION

PATENT NO. : 3,954,426
DATED : May 4, 1976
INVENTOR(S) : Lennart Bertil Vilhelm Brange It is certified that error appears in the above-identified patent and that said Letters Patent are hereby corrected as shown below:

Claim 6, line 7, after "an" insert --axis and defining an--.

Signed and Sealed this twenty-ninth Day of June 1976

[SEAL]

Attest:

RUTH C. MASON
Attesting Officer

C. MARSHALL DANN
Commissioner of Patents and Trademarks